United States Patent
Blanc et al.

(10) Patent No.: US 9,247,845 B2
(45) Date of Patent: Feb. 2, 2016

(54) INFUSION DEVICE HAVING PRESSURE VARIATION

(75) Inventors: Jean-Pierre Blanc, Nice (FR); Alain Goering, Nice (FR)

(73) Assignee: Compagnie Mediterraneenne des Cafes (FR)

( * ) Notice: Subject to any disclaimer, the term of this patent is extended or adjusted under 35 U.S.C. 154(b) by 350 days.

(21) Appl. No.: 13/700,032

(22) PCT Filed: May 23, 2011

(86) PCT No.: PCT/EP2011/058384
§ 371 (c)(1),
(2), (4) Date: Jan. 16, 2013

(87) PCT Pub. No.: WO2011/147786
PCT Pub. Date: Dec. 1, 2011

(65) Prior Publication Data
US 2013/0108754 A1  May 2, 2013

(30) Foreign Application Priority Data

May 25, 2010 (FR) .................................... 10 54014

(51) Int. Cl.
*A47J 31/40* (2006.01)
*A47J 31/36* (2006.01)
(Continued)

(52) U.S. Cl.
CPC .............. *A47J 31/36* (2013.01); *A47J 31/3623* (2013.01); *A47J 31/46* (2013.01); *A47J 31/24* (2013.01)

(58) Field of Classification Search
CPC ........... A47J 31/24; A47J 31/34; A47J 31/36; A47J 31/3623

USPC ............ 99/295, 279, 289 R, 290, 302 R, 304, 99/305, 316; 222/146.5
See application file for complete search history.

(56) References Cited

U.S. PATENT DOCUMENTS 3,537,384 A * 11/1970 Stauber ........................ 99/302 R
4,583,449 A * 4/1986 Dangel et al. .................... 99/279
(Continued)

FOREIGN PATENT DOCUMENTS

| EP | 1219217 | 7/2002 |
| EP | 1295554 | 3/2003 |

(Continued)

OTHER PUBLICATIONS

English translation of Written Opinion dated Nov. 27, 2012 issued in corresponding International Appln. No. PCT/EP2011/058384.
(Continued)

*Primary Examiner* — Reginald L Alexander
(74) *Attorney, Agent, or Firm* — The Farrell Law Firm, P.C.

(57) ABSTRACT

The present invention relates to a device for infusing a substance to be infused having an infusion chamber for receiving the substance to be infused and for passing a pressurized water flow through the substance to be infused, the infusion chamber having an inlet portion (4) for feeding water into the infusion chamber and an outlet portion (2) for the infused beverage, the injection channel in fluid communication via an injection end with the inlet portion (4) and adapted for connection via an intake end (39) to a pressurized water circuit, characterized in that it comprises adjustable means for varying the water pressure in the injection channel, adapted for generating a water pressure difference between the intake end (39) and the injection end (40) and controlled by control means outside the infusion chamber.

15 Claims, 12 Drawing Sheets

(51) Int. Cl.
*A47J 31/46* (2006.01)
*A47J 31/24* (2006.01)

(56) References Cited

U.S. PATENT DOCUMENTS

| | | | |
|---|---|---|---|
| 4,767,632 A * | 8/1988 | Meier | 426/231 |
| 4,871,089 A * | 10/1989 | Rader et al. | 222/54 |
| 5,000,082 A * | 3/1991 | Lassota | 99/304 |
| 5,325,765 A * | 7/1994 | Sylvan et al. | 99/295 |
| 5,645,230 A * | 7/1997 | Marogna et al. | 241/27 |
| 5,794,519 A * | 8/1998 | Fischer | 99/295 |
| 6,382,083 B2 * | 5/2002 | Schmed | 99/289 R |
| 6,584,888 B2 * | 7/2003 | Cortese | 99/289 R |
| 7,028,604 B2 * | 4/2006 | Cortese | 99/295 |
| 7,296,714 B2 * | 11/2007 | Byerly | 222/504 |
| 8,512,784 B2 * | 8/2013 | Denisart et al. | 426/433 |
| 8,600,223 B2 * | 12/2013 | Etter et al. | 392/492 |
| 9,003,957 B2 * | 4/2015 | Pagano | 99/287 |
| 2002/0088348 A1 * | 7/2002 | Cortese | 99/295 |
| 2003/0070554 A1 * | 4/2003 | Cortese | 99/279 |
| 2004/0031394 A1 * | 2/2004 | Yoakim et al. | 99/279 |
| 2005/0150391 A1 * | 7/2005 | Schifferle | 99/295 |
| 2005/0183581 A1 * | 8/2005 | Kirschner et al. | 99/295 |
| 2006/0207432 A1 * | 9/2006 | Van Der Meer et al. | 99/279 |
| 2007/0000390 A1 * | 1/2007 | Albrecht | 99/279 |
| 2007/0248734 A1 * | 10/2007 | Denisart et al. | 426/569 |
| 2008/0000357 A1 * | 1/2008 | Yang et al. | 99/279 |
| 2008/0050480 A1 * | 2/2008 | Doglioni Majer | 426/231 |
| 2008/0236403 A1 * | 10/2008 | Cortese | 99/323 |
| 2009/0013876 A1 * | 1/2009 | Ranzoni | 99/303 |
| 2009/0120299 A1 * | 5/2009 | Rahn et al. | 99/279 |
| 2009/0205503 A1 * | 8/2009 | Cortese | 99/295 |
| 2009/0223376 A1 * | 9/2009 | Navarini et al. | 99/293 |
| 2010/0037779 A1 * | 2/2010 | Pecci et al. | 99/289 R |
| 2010/0047407 A1 * | 2/2010 | Carbonini | 426/231 |
| 2010/0282090 A1 * | 11/2010 | Etter et al. | 99/288 |
| 2011/0189362 A1 * | 8/2011 | Denisart et al. | 426/433 |
| 2013/0108754 A1 * | 5/2013 | Blanc et al. | 426/431 |

FOREIGN PATENT DOCUMENTS

| | | | |
|---|---|---|---|
| WO | WO 9507041 | 3/1995 | |
| WO | WO 2006005756 A1 * | 1/2006 | A47J 31/40 |
| WO | WO 2009043851 A2 * | 4/2009 | F24H 1/14 |

OTHER PUBLICATIONS

PCT/ISA/237 Written Opinion issued on PCT/EP2011/058384 (pp. 5).

* cited by examiner

INFUSION DEVICE HAVING PRESSURE VARIATION

PRIORITY

This application is a U.S. National Phase application of International Application No. PCT/EP2011/058384 filed May 23, 2011, claiming priority to Application No. 10 54014 filed with the French Industrial Property Office on May 25, 2010, the contents of each of which incorporated herein by reference.

The present invention relates to a device for making a beverage by infusing a substance. Ground coffee, loose or in watertight or non-watertight packaging are included in such substances. Tea leaves or other products such as chocolate, soup or plants in leaf or extract form are also part of these substances to which the term infusion in its widest sense extends for the extraction of drinkable components by passing water through the substance. The invention applies particularly to drinks prepared by infusion, and in particular to espresso type drinks.

In this latter field, an espresso coffee is made by infusing a predefined quantity of roasted and ground coffee by passing hot water at high pressure through a previously closed infusion chamber.

The popularisation of espresso coffee has led to the emergence of domestic espresso coffee machines using premeasured portions of coffee in the form of pods or capsules containing the exact amount of previously roasted and ground coffee.

In this field, the infusion is typically accomplished by placing the premeasured dose in a volume, herein called the infusion chamber, through which is passed pressurised hot water. A drink is recovered downstream of the infusion chamber after the extraction of the infusible substance. The extraction phase requires that the chamber is closed, whereas the introduction of the substance and its removal take place with the chamber open.

Different systems have been developed over the last few decades to facilitate the positioning of the portion while limiting its handling. One of the most common systems is the use of an infusion chamber in two parts, one being fixed and the other mobile. The open and closed configurations of the infusion chamber can be generated by the relative mobility of the two parts of the infusion chamber. The publication WO-A1-9507041 is an illustration of this principle with packaging of the substance to be infused in pod form, the inner volume of which is enclosed in a filter paper envelope and a cardboard ring.

One of the two half chambers comprises the intake of pressurised hot water whereas the other has a spout through which the infused coffee is distributed from the pod contained in the infusion chamber. The infusion pressure is generated by a pump equipping the machine and which is usually a vibrating pump the operating principle of which is based on the movement of a magnetic core through a cylinder under the effect of a magnetic coil fed by the mains AC voltage through a diode. The cylinder is tightly connected to the water circuit both upstream and downstream of the pump so as not to leak. A diode cuts out every negative half alternation of the mains and causes the coil to be fed with power during half the time of each alternation. The power of the coil generates a magnetic field in the ferromagnetic parts around it proportional to the number of coil windings and the current flowing through it. The magnetic circuit formed of ferromagnetic parts around the core is intentionally open close to the central core. Under the effect of the coil's magnetic field, induction tend to close the magnetic circuit by the movement of the mobile core. A spring is applied to one side of the core to cause it to return to its initial position in the absence of a magnetic field. Due to the effect of the mains alternating voltage, the central core is moved during half the time of an alternation under the effect of the magnetic field generated by the coil, and returned to its position under the effect of the spring during the second half of the alternation time.

By the action of two non-return valves positioned correctly at the outlet of the tube in which moves the central magnetic core, the said core draws in water upstream of the pump intake and pushes it towards the downstream outlet. There is a relationship between the pressure in the hydraulic circuit downstream of the pump and its flowrate, a relationship that results in a characteristic operating curve and which remains similar for all the vibrating pumps on the market.

Document EP-A1-1 295 554 discloses a coffee machine with a plug fitted against a spring the pre-tensioning of which defines a water pressure to be achieved in order to open the plug and cause the water to circulate in the direction of the ground coffee. This document confirms that the hydraulic behaviour of the water injection circuit is generally defined in the factory.

The invention overcomes at least in part the disadvantages of previously known techniques for this purpose and proposes a device for infusing a substance to be infused with:
- an infusion chamber for receiving the substance to be infused and passing pressurised water through the substance to be infused, the infusion chamber having a water intake part in the infusion chamber and an infused drink outlet part,
- an injection channel in fluid communication, by an injection end, with the intake part connectable by an intake end to a pressurised water circuit, characterised in that it comprises means for adjusting the water pressure in the injection channel arranged to generate a pressure difference between the intake end and the injection end.

According to one aspect, control means are used to control the adjustment means from outside the infusion chamber.

Preferably, this control of the pressure from outside the infusion chamber means that there is no need to intervene at the intake part and the outlet part, particular by their side situated inside the infusion chamber. The ability to change the pressure during the infusion process is a particularly interesting feature. Advantageously, the control means comprise means accessible to the user operating the beverage making machine. This accessibility is carried out advantageously from outside the device. The latter is preferably incorporated in a machine that includes other components. In this case, the control can be carried out using means present on the outer surface of the machine, in particular the surface of a hood. This does not mean that the control means are protected by a removable cover. They remain accessible throughout normal use of the device incorporated in the machine.

Thanks to the invention, and preferably without making heavy alterations to the water circuit and by using a conventional pump such as a vibrating pump, the resulting operating pressure and flow inside the infusion chamber can be varied within a wide range of values. This is a significant improvement because, at present, the application of this type of pump or other means for pressurising the water in domestic coffee machines limits their possibilities and it is now accepted that a machine is no longer devoted to one type of beverage or to types of beverages involving similar infusion pressures.

At present, there is significant prejudice against machines devoted exclusively to one type of beverage.

The advantage is to provide the user with new varieties of pods containing substances to be infused very different from espresso coffee, such as chocolate, soup, long coffees, tea and herbal infusions that can be infused in better conditions using the same machine. This advantage relies on the addition of means enabling the pressure/flow values to be adjusted to the ideal values giving the best taste quality for each type of beverage. The machine proposes simple adjustment means, preferably accessible to the user, such as the rotation of a control knob or pressing on a control button.

The advantage is to have a single item of household equipment that can be used to make all types of beverages. This saves considerable kitchen space, reduces energy consumption and generates less waste.

The addition of such an advantageous device also has a major impact on the industrial organisation, the production costs, and on the brand image and customers' perception of quality.

This variable pressure device can also be proposed as an option on machines equipped in series with a fixed device, thereby offering the user the opportunity to improve his/her machine by replacing a few parts and increasing the service life of the machine.

In an advantageous arrangement, the pressure is adjusted through changes to the pressure drops, in particular using components that constitute an obstacle with a variable configuration in the flow of water.

Other aims and advantages will become apparent from the following detailed description. Firstly, the following optional characteristics can be implemented alternatively or cumulatively in the context of this invention:

- a hood that covers at least partially the infusion chamber, the control means being accessible on the outside of the hood;
- the control means are configured so as to operate the adjusting means when the infusion chamber is closed;
- the control means are configured to allow operation of the adjusting means in order to vary the water pressure during the passage of water through the substance to be infused;
- the control means comprise a manually movable part, the water pressure being a function of the position of the manually movable part;
- the control means comprise an electric circuit and at least one button for operating the electric circuit;
- the control means comprise means for storing data relating to at least one pressure curve to be applied during an infusion cycle.
- the control means comprise a valve fitted opposing the elastic return means and configured to close off the injection channel when the water pressure exerted on the valve is less than the elastic means return force and the means for adjusting the return force;
- the elastic means comprise a compressible device and the adjustment means comprise means for varying the compression of the compressible device;
- the means for varying the compression comprise a component pressing on the compressible device, the position of the said component being adjustable to suit the direction of compression of the compressible device,
- the means for varying the compression force comprise a screw forming a helicoidal slide for movement of the compressing component,
- the compressing component is a slider that is translationarily movable by tightening or loosening the screw,
- the screw is fitted so as to be rotationally mobile only and the helicoidal slide is formed between the screw and the slider,
- the device comprises a surface for blocking translation of the screw, the said surface being movable between an active blocking position of the screw and an inactive position for extraction of the screw,
- the blocking surface is configured to press against a bearing surface of the screw by exerting a force on the screw opposing the decompression of the compressible part,
- the device comprises means for applying rotation to the screw,
- the said means comprise a manually-operated or motor-driven rotational control.
- the compressible member is a coil spring.

The invention also relates to a machine for making drinks by infusion comprising a device according to the invention and a pressurised water circuit equipped with a pump that may be a vibrating pump.

The invention also relates to a method for infusing a substance wherein the following steps are performed: reception of a substance to be infused in an infusion chamber with water inlet portion and an infused beverage outlet portion; passage of a flow of pressurised water through the substance to be infused via a fluid injection channel in fluid communication with an injection end, with the inlet portion and connected, by an injection end to the pressurised water circuit, characterised in that it comprises a step for varying the water pressure in the injection channel in order to generate a different pressure between the inlet end and the injection end, the said change being operated from outside the infusion chamber.

The variation stage takes place preferably during the passage of the water flow through the substance to be infused.

The drawings attached are given by way of examples and are not exhaustive. They represent only one embodiment of the invention and will make it possible to understand it easily.

Figure 1:
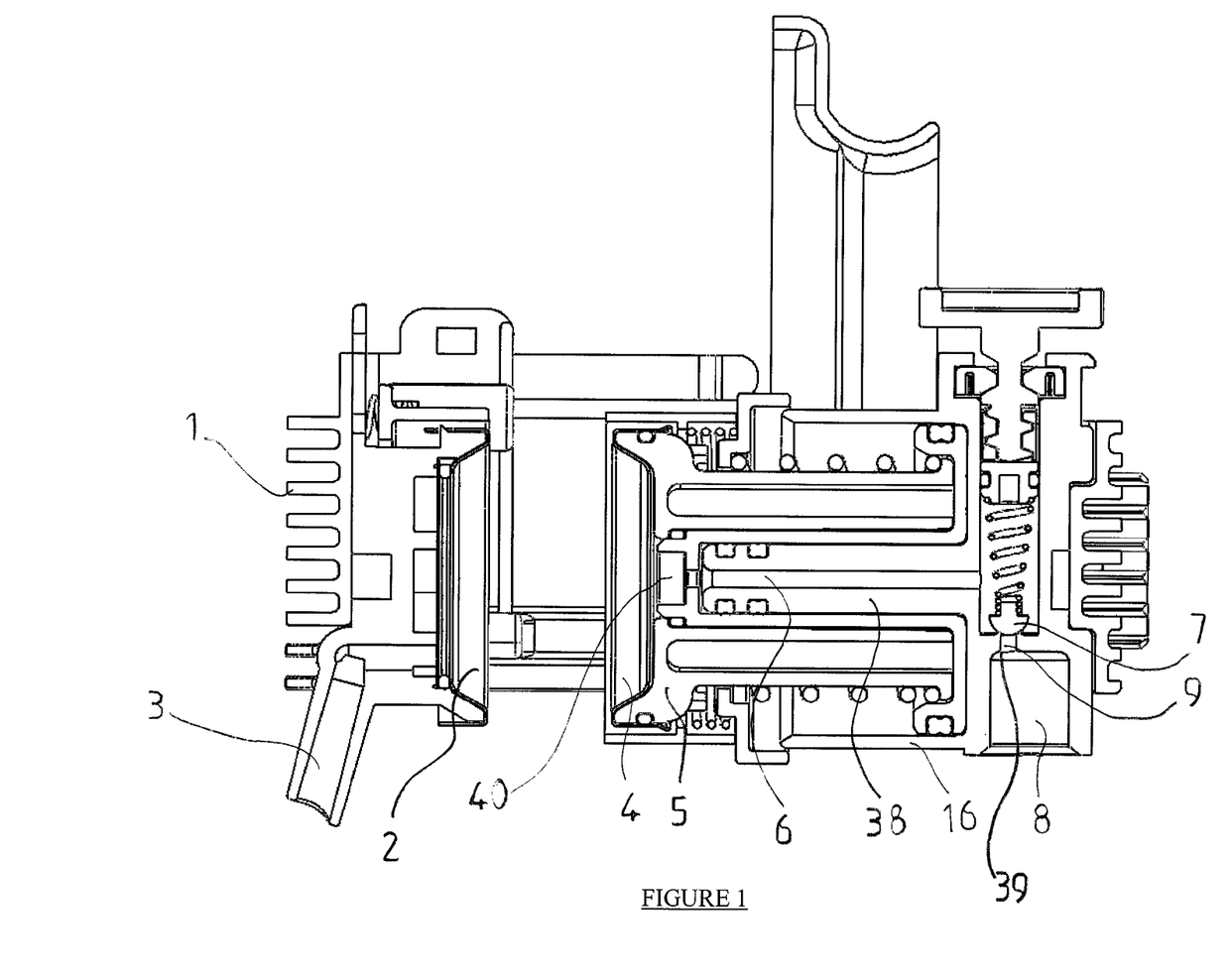
FIG. 1 shows a longitudinally section of an embodiment of the invention.

In the example shown in FIG. 1, and as a preferred arrangement, the invention relates to machines for packaging substances to be infused partly automated to produce beverages from the infusion of the substance in the packaging.

The machine shown in FIG. 1 comprises a chassis 1 in the form of peripheral belt capable of supporting the various internal components. One of these is an inlet portion 4, another is an output portion 2. Portions 2 and 4 may be moved closer together or further apart, for instance by the movement of the inlet portion 4 which, in the example shown, acts with a cylinder piston which forms the drive means 5 connected to the input portion 4. The cylinder also comprises a body 16 and means for bringing the infusion chamber back to the default open position. This type of mobility is not limiting and other means of movement fall within the scope of this invention. Similarly, it is also possible to combine the translational and rotational mobilities and a movement of the outlet portion 2.

When brought together and docked, the portions 2 and 4 define an inner volume that constitutes an infusion chamber. Packaging, for example made from sheets of filter paper joined around their periphery, may contain different substances to be infused as indicated in the introduction to the present description. There follow various procedures in terms of the water flow conditions through the substance to be infused.

Below is an example of water circulating through the invention machine. In general, the machine is configured in order to co-act with a pressurised water circuit. The circuit in question is advantageously equipped with a water storage tank, a boiler capable of heating the water, in particular to make hot beverages, and a pump such as a vibrating pump for pressurising the water in the water circuit up to a predetermined pressure. The circuit is connected to the invention machine by a connection opening 8, an example of which is shown in particular in FIGS. 1 and 2, in order to bring the water in the circuit at the intake end 39 to an injection channel, situated at least in part in the case shown, inside the cylinder constituting the drive means 5. More specifically, the piston of the drive means 5 is guided round a central guide part 38 within which is formed a downstream portion 6 of the injection channel, the term "downstream" depending on the direction of the water flow. An upstream portion 9 of the injection channel is formed, the portions 6 and 9 being separated by means which will be detailed further on.

The downstream portion 6 of the injection channel connects at the inlet portion 4 to an injection end 40 shown here in the form of a bowl with perforations capable of ensuring the supply of water to the inner volume of the infusion chamber when the latter is in the closed position. It will be understood that the water passes through the inner volume of the infusion chamber containing the substance to be infused and then flows through one or several passages formed in the outlet portion 2 towards a spout 3 at the level of which a container may be positioned. The present invention enables the flow parameters in the machine to be adjusted and especially at the injection channel. In the example shown, the variation consists in a variation of the pressure by a modifiable pressure drop between the upstream portion 9 and the downstream portion 6 of the said injection channel. It is to be noted that the configuration shown for the injection channel is not exhaustive.

FIGS. 2 to 5 show in greater detail an embodiment of the means for adjusting the pressure of the water in the injection channel.

Figure 2:
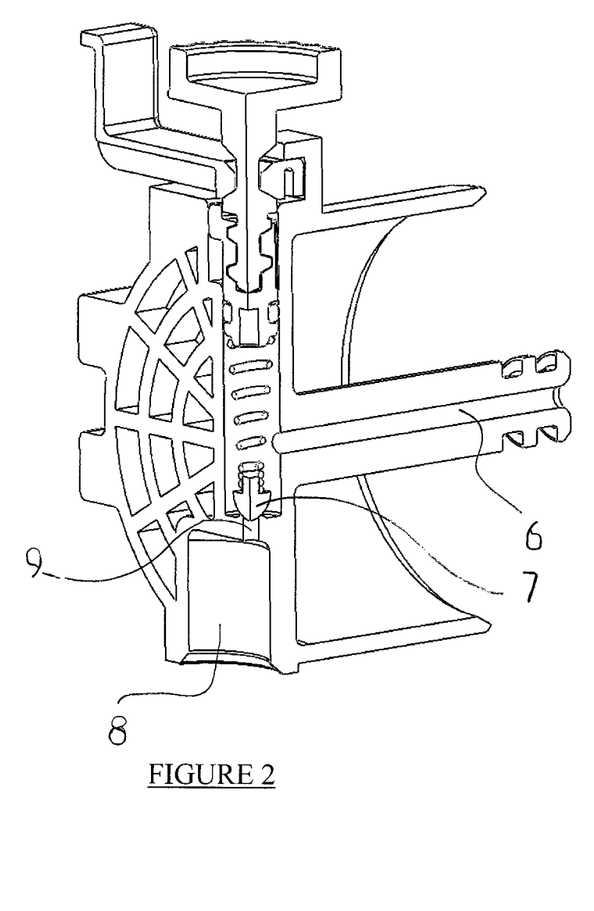
FIG. 2 shows a partial perspective view of the adjustable means in a preferred embodiment.

FIG. 2 shows a valve 7 adapted to apply on an opening in the injection channel between its upstream part 9 and its downstream part 6. More specifically, the injection channel has an intermediate opening in the injection channel at the valve 7 at which the valve 7 could have a clearance that allows the water to flow into the injection channel or closes the said duct to prevent the flow of water. The valve 7 is shown rounded or substantially ogival and closes the injection channel. In order to be applied to the upstream part 9, the valve 7 is fitted opposing the elastic return means in the closed default position. As an illustration, the elastic means may be a coil spring able to be compressed as shown in the various figures. One of the ends of the spring 10, the lower end, presses on a part of the valve 7 opposite its surface plugging the injection channel. The other end of the spring 10, the upper end, presses on a support base 12 shown on FIG. 3. It will be understood that spring compression applies pressure to the valve 7 so as to place it in the default closed position. This closed position can be countered when the pressure exerted on the valve 7 by the water from the pressurised circuit is greater than a predetermined value corresponding to the return force applied by the elastic means, in the present case in the form of a spring 10. According to the invention, the device is adjustable so that the return force of the elastic means can be varied in order to alter the pressure drops created by the operation of the valve 7.

Figure 3:
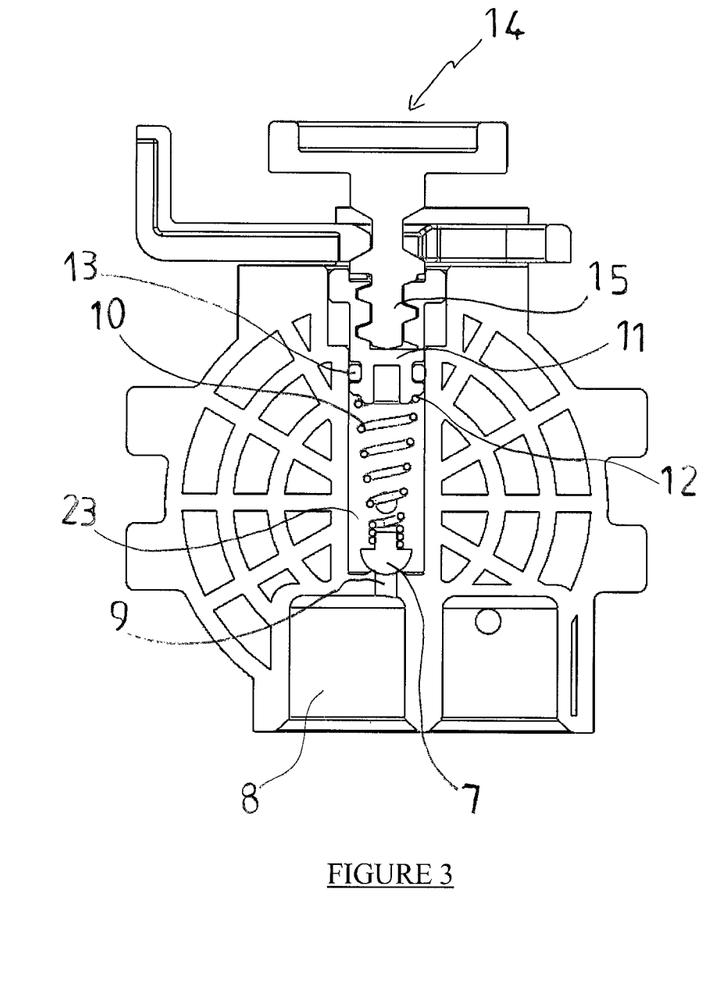
FIGS. 3 to 5 are sectional views of the invention in three operating positions.
Figure 4:
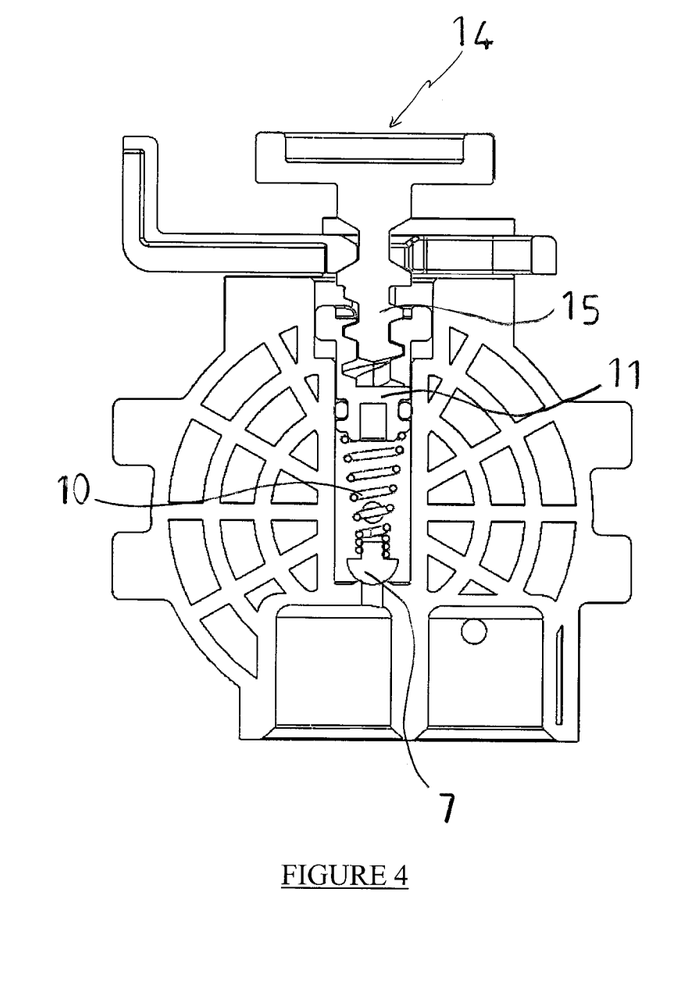
Figure 5:
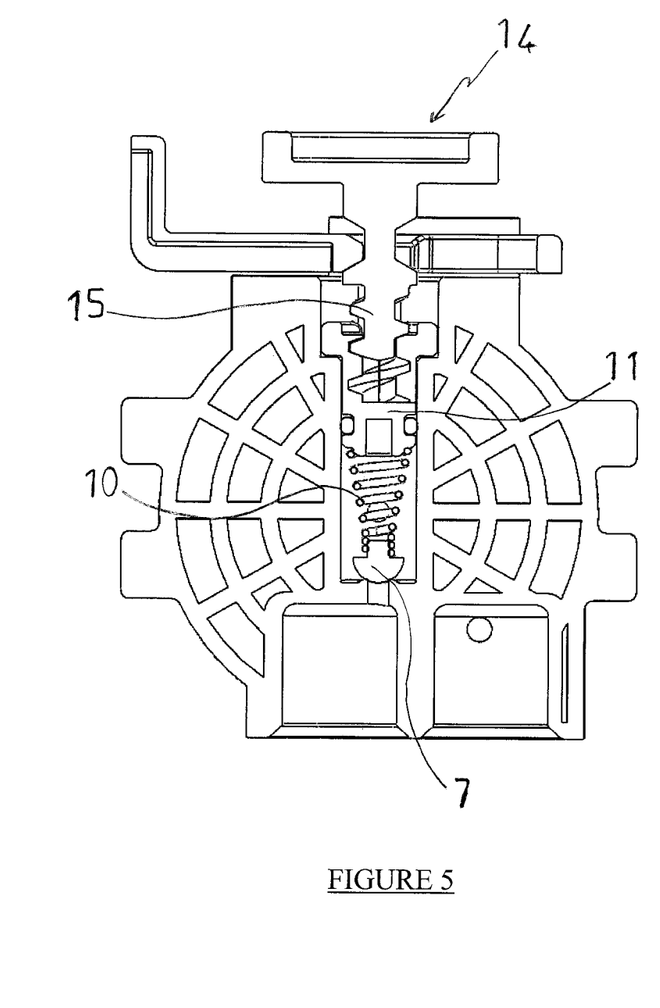

Thus, on FIG. 3, a minimal compression of the spring 10 is shown producing an initial low return force on the valve 7. In FIG. 4, the spring 10 is further compressed so that the pressure on the valve 7 increases. An even higher compression is shown in FIG. 5. It will be understood that, whereas in the case of FIG. 3 the pressure downstream of the valve 7 will be lower and the flow higher, these 2 volumes will evolve inversely as the compression of the spring 10 is increased. Thus, in the situation shown on FIG. 5, the downstream pressure at valve 7 is much higher and the flow much less. Thanks to the adjustments of the pressure exerted by the elastic means on the valve 7, the flow parameters and especially the pressure can be varied in a wide range, for example between 2 and 20 bars.

Figure 6:
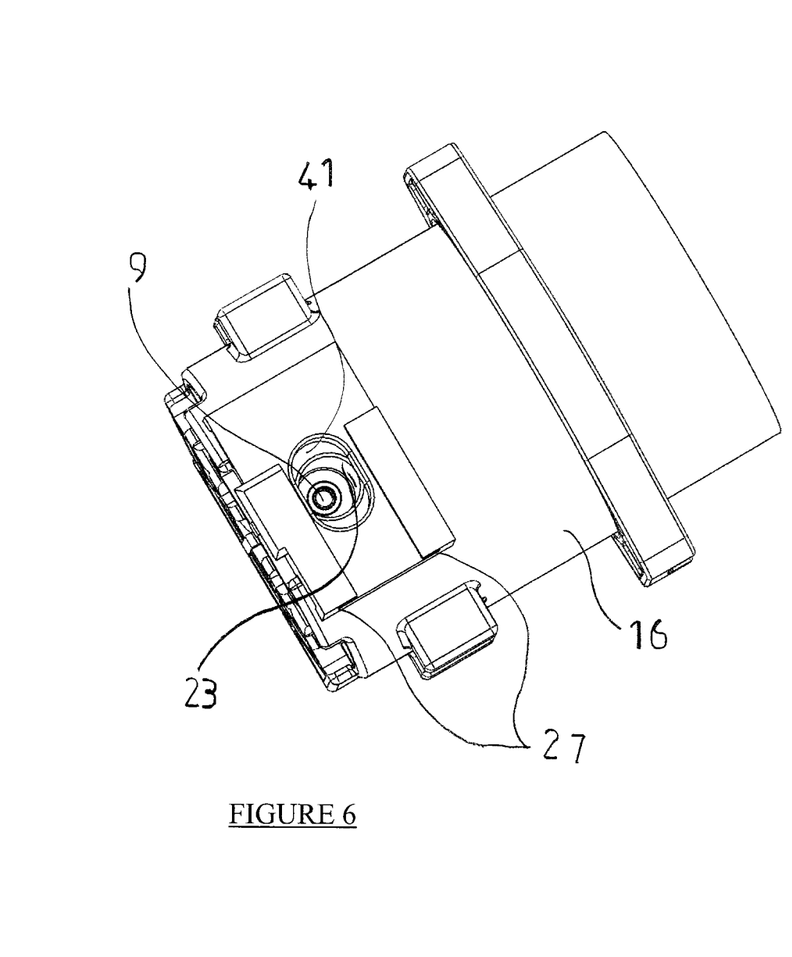
FIGS. 6 to 11 show possible configurations of certain parts of the invention.
Figure 7:
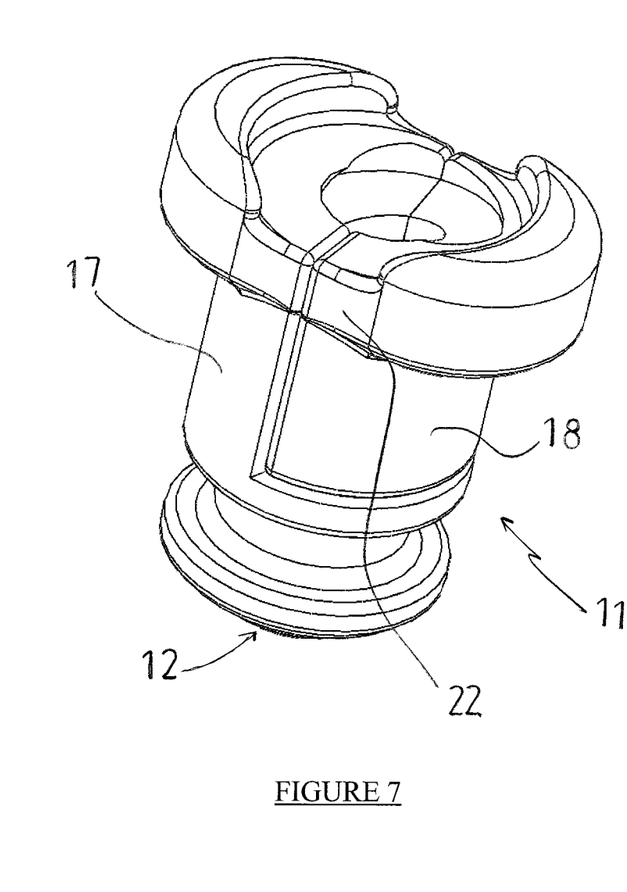

This variation takes place in the embodiment shown by way of a system operating a helicoidal slide. More specifically, the compression of the compressible body consisting of the spring 10 is modified by a translational movement of the support base 12 on which bears the end of the spring 10 opposite the valve 7. In a preferred arrangement, the support base 12 is a surface portion of a slider 11 fitted so as to carry out the translational movement in a direction corresponding to the direction of the spring 10 in a hole 23 created in the body of the device as shown in particular on FIG. 6. It will be noted that, on FIGS. 6 and 7 the outer shape of the slider 11 and the shape of the hole 23 are formed in a similar manner so that these 2 elements coact and the slider 11 can be advantageously guided in translation by removing its rotational feature. This takes place in particular through the guide surface 22, shown here as flats in a relatively oblong section of the slider 11.

Figure 9:
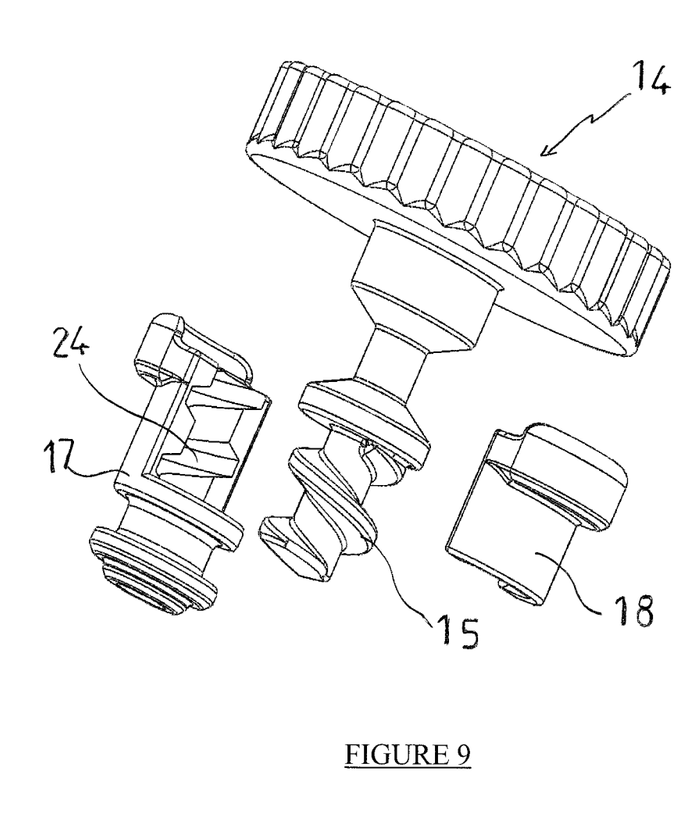

The slider 11 has an internal thread 24, an example of which is partially shown in the part 17 of the slider 11 in FIG. 9 co-acting with a second part 18 added to it. The slider consists advantageously of two asymmetrical parts, one of which is integral with the support base to allow its extraction. The simple shapes of the parts 17 and 18 allow economic manufacture by pressurised injection of the plastic material.

The thread 24 coacts with the threads 15 of a screw 14 so as to perform the above-mentioned helicoidal slide. This connection leads to a translational movement of the slider 11 when the screw 14 is rotated that can move upwards or downwards the support base 12 on which applies the compressible device consisting in the example of the spring 10.

Figure 10:
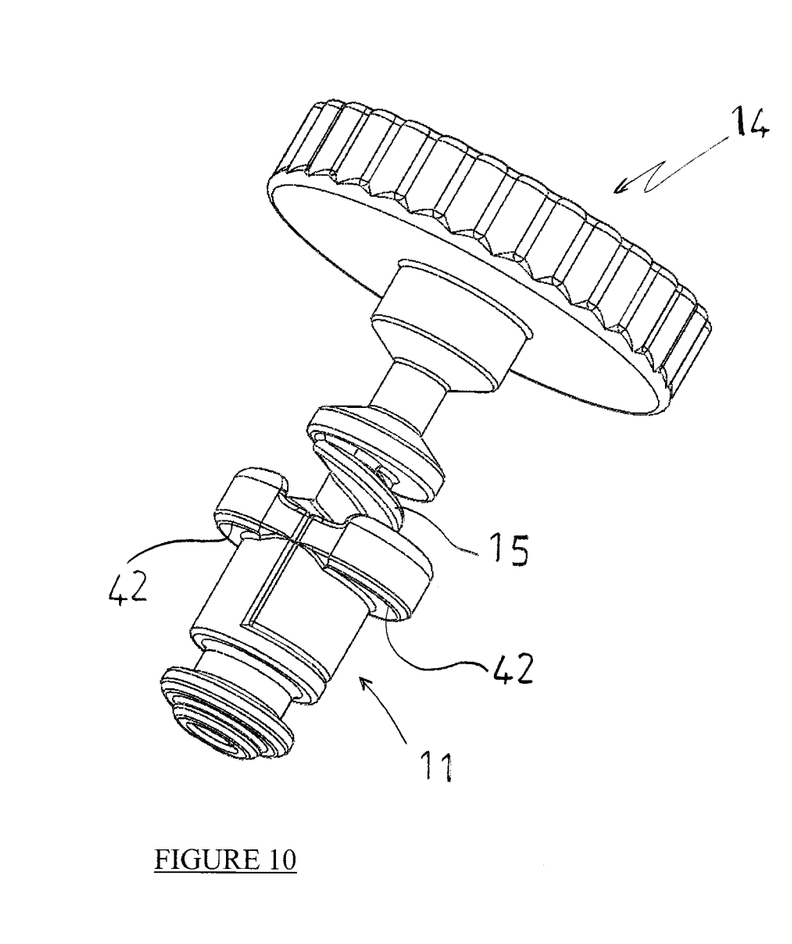
Figure 11:
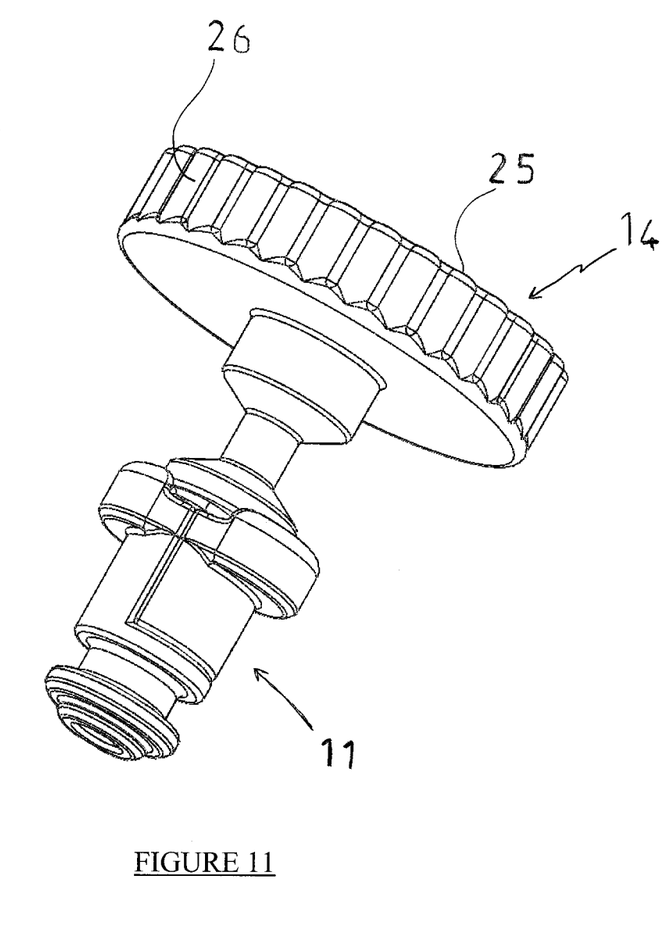

The screw 14 has a head 25, the configuration of which can be adapted to the required rotational mode of operation. For example, in the case of FIGS. 9 to 11, the head 25 comprises a peripheral part constituting a ring gear 26 facilitating its handling by the user. Thus, the ring gear forms the means providing manual operational control. Other possibilities for rotationally driving the screw 14 will be described below. In particular, the control means may include an electrical or electronic part for operation by the motor.

The part of the hole 23 in which is situated the spring 10 and the valve 7 is brought into contact with the water flowing in the injection channel (this part of the hole 23 is an opening that is part of the injection channel in which circulates the water to be brought to the infusion chamber). The seal relative to the rest of the hole 23 and in particular relative to the part situated outside for adjusting the rotation of the screwed 14 has to be ensured. To do this, the slider 11 as a groove 19 in the example in which can be inserted a seal 13 adapted to apply a seal on the periphery of the hole 23 at this preferably circular location. The radial force of the seal causes friction to arise that, in the absence of pressure in the hole 23, leads to translational blocking of the slide 11. The integration of the seal with the part 17 forming the slider 11 forces the movement of the slider 11 under the action of the thread 15 on the internal thread 24 and facilitates its entire extraction if required.

Moreover, the adjustment system can be easily removed, particularly for maintenance or repair work. An example of the ease of dismantling and reassembly is given below with reference to the FIGS. 12 and 19. This dismantling occurs advantageously from the outer shell of the machine without removing any parts of the infusion chamber.

Figure 8:
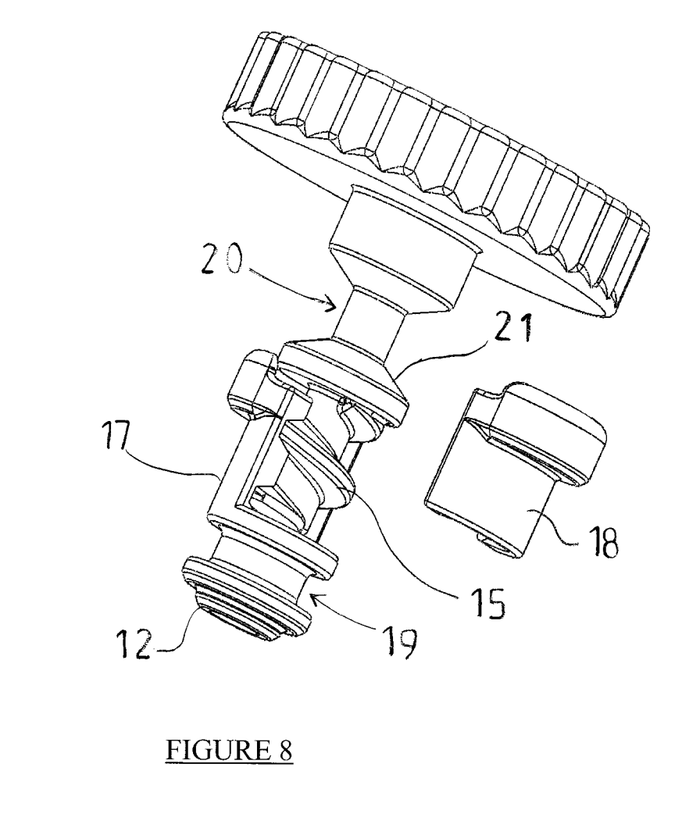
Figure 12:
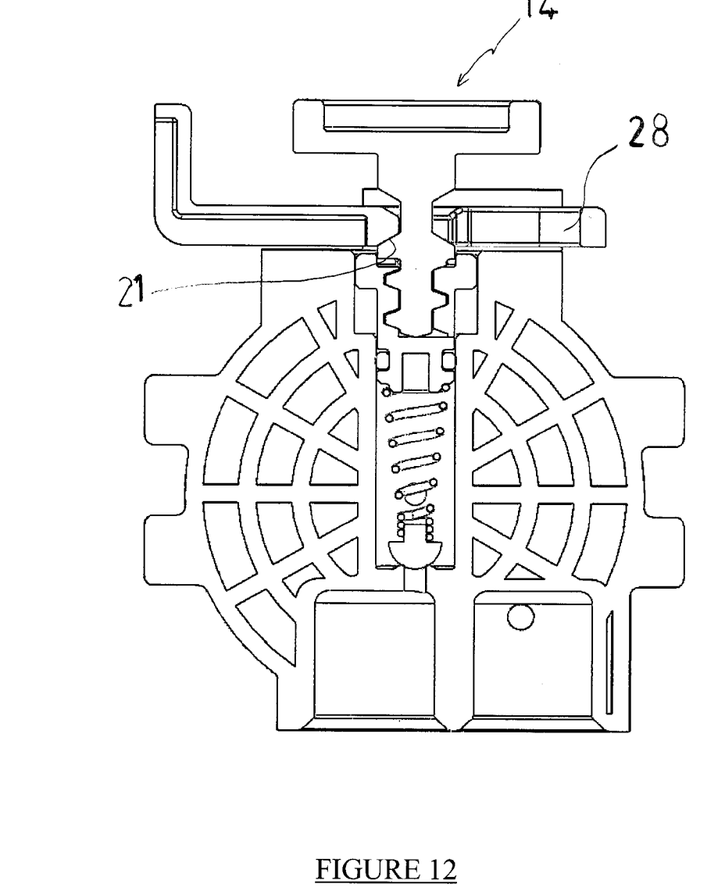
FIGS. 12 to 17 show the successive phases of dismantling of the adjustable means of the invention.

On FIG. 12 has been identified a bearing component 21 on the body of the screw 14 able to coact with a portion of a lock 28 to stop the translation of the screw 14 in the longitudinally direction. This lock 28 allows the screw 14 to make a rotational movement by prohibiting a translational movement. Advantageously, the bearing surface 21 is formed at a cruise 20 identified in FIG. 8. The bearing component 21 is preferably sloping as is the corresponding surface on the lock 28. This functional configuration to allow the adjustment of the water pressure as shown on FIG. 12.

When it is required to dismantle the adjustable means, the force exerted by the locking surface 33 of the lock 28 on the bearing component 21 of the screws 14 has to be countered to allow movement of the lock 28. The need to overcome this force is an additional safety feature offered by the invention that avoids a user from not being able to easily move the lock 28 when the water exerts a high-pressure. Furthermore, the removal of the adjustable means is advantageously made impossible when setting at the highest pressure. Indeed, when adjusting the maximum pressure, the contact surfaces under the slider identified 42, 42 on FIG. 10 come into contact with the surface of the limit switch 41 limiting the upper part of the hole 23 visible on FIG. 6. In this configuration, the vertical translation downwards of the slider assembly 11 and the screw 14 is prevented. The screw 14 on the slider 11 then has to be unscrewed in order to decompress the system until there is sufficient distance between the surface 21 and the locking surface 33 to permit transversal displacement of the lock 28. To this end, the water pressure at part 23 in which the water flows provides the opportunity for dismantling the adjustable means conditioned at low pressures.

Figure 13:
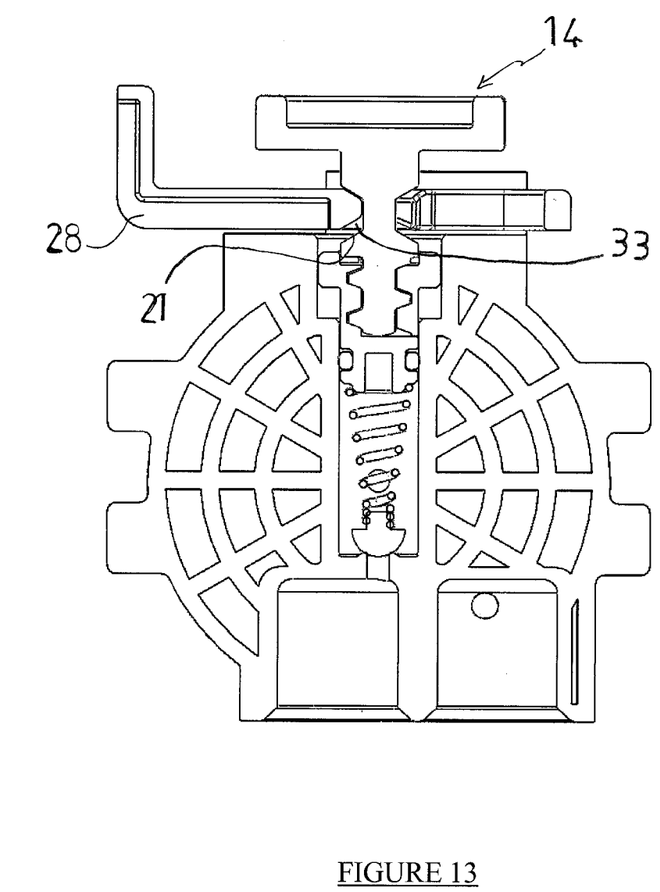

In the case of FIG. 13, as the pressure is low enough to allow the user to start the movement of the screw 14 in a compression direction, the lock 28 can be operated advantageously by the translational movement in a direction transversal to the direction of spring 10 compression so as to alter its position. The lock 28 may be moved translationarily through the flat side surfaces 30 formed on the lock 28 and co-acting with the rails 27 formed on a part of the machine body. This example can be seen notably on FIG. 19.

Figure 19:
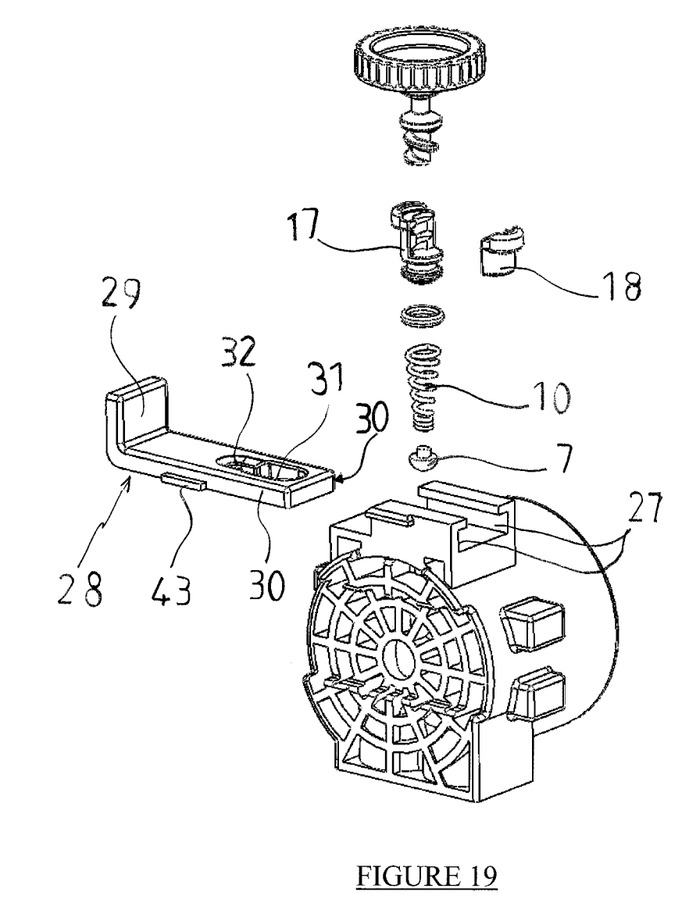

This same FIG. 19 shows transversal stops 43, the purpose of which is to limit the travel of the lock 28 so as not to damage the screw 14 during assembly by severing this screw at its throat 20 which has a small cross-section and which is therefore more liable to break.

Figure 14:
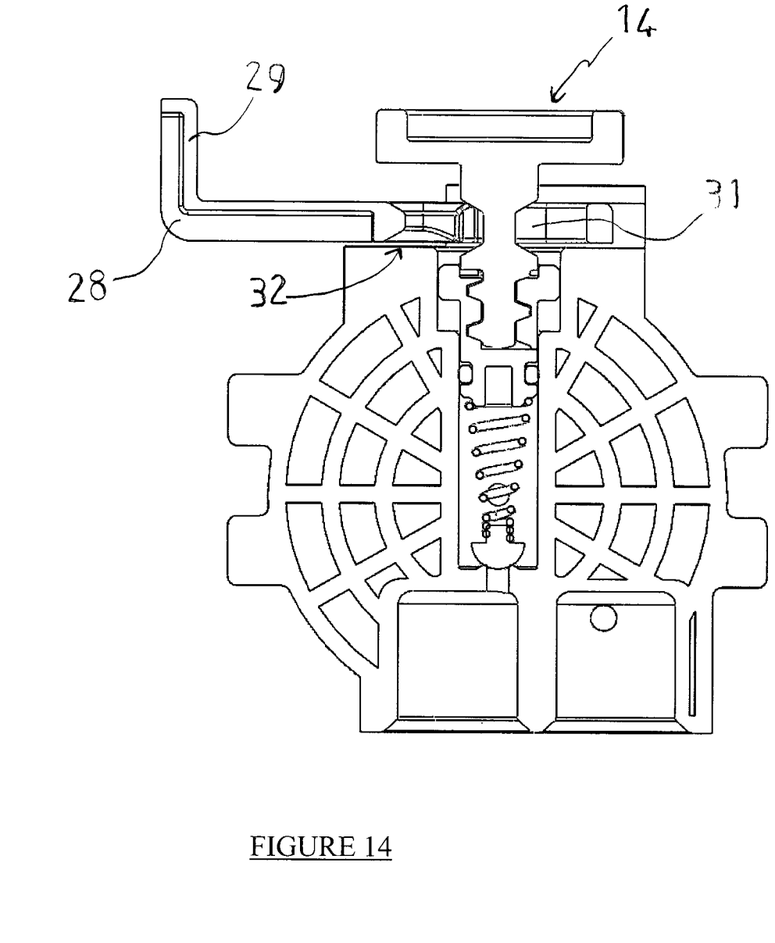
Figure 15:
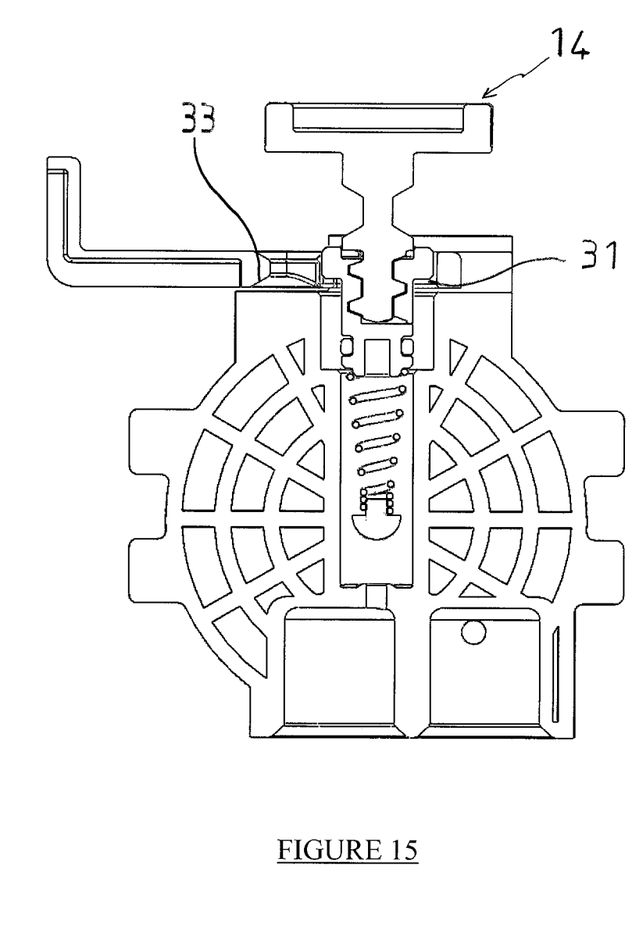
Figure 16:
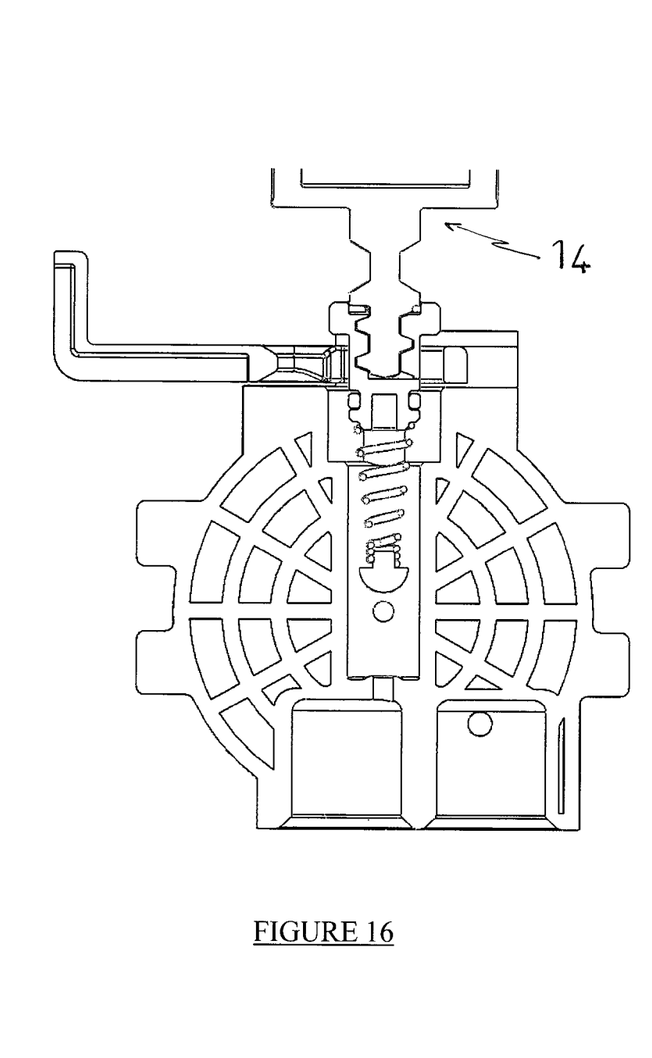
Figure 17:
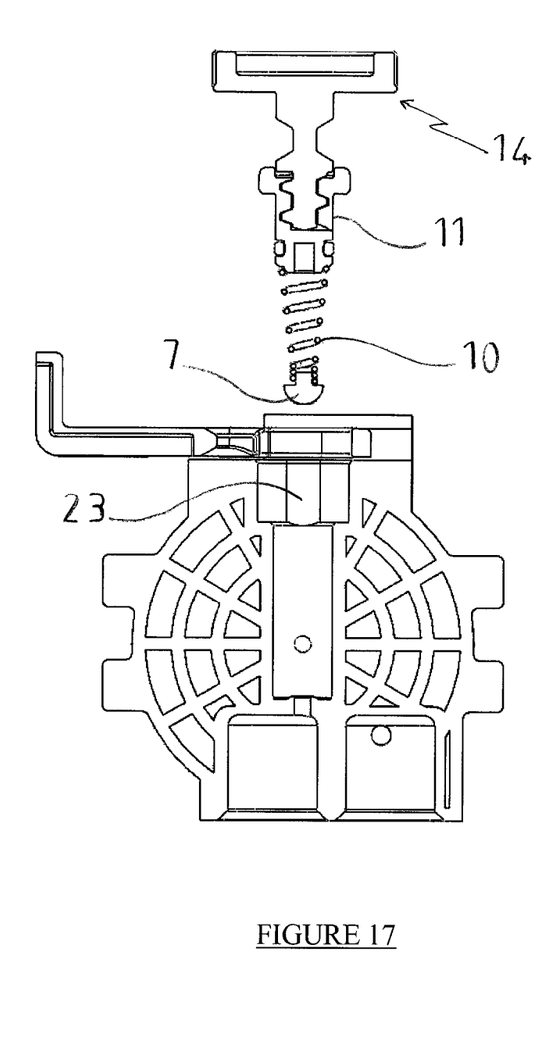
Figure 18:
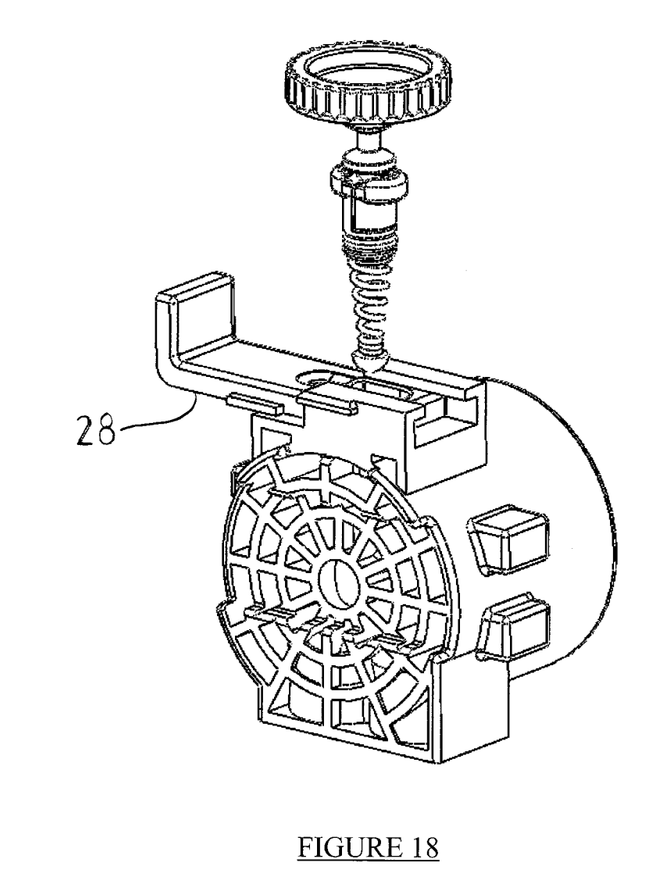
FIGS. 18 and 19 are exploded perspective views.

The lock 28 that is placed in a position for dismantling brings the assembly to the configuration shown on FIG. 14. At this stage, whereas previously the locking surface 33 was active in order to prevent the translation of the screw 14, the surface 33 is then inactive and is no longer opposite the bearing component 21. Thus, while in this blocking position, the screw 14 passes through a locking orifice of the lock 28 and finds itself in the case of FIG. 14 opposite an extraction orifice 31, the dimensions of which are such that the screw 14 is able to cross it. The movement to extract this screw 14 which follows is shown in FIG. 15. FIG. 16 shows a successive extraction stage, the movement of the slider/spring/valve assembly following the extraction movement of the screw 14. In FIG. 17, the extraction of the adjustable means has been entirely completed. FIG. 18 shows the result in perspective and FIG. 19 illustrates the capacity to separate the constituent parts of the adjustable means in particular for their replacement or cleaning.

Figure 21:
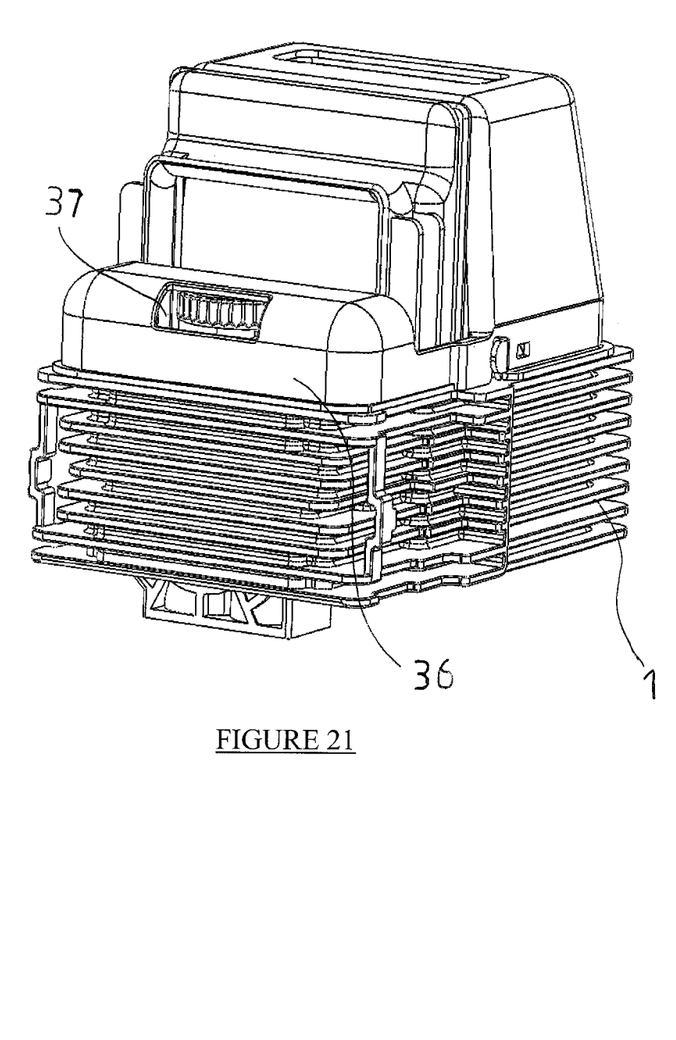
Figure 22:
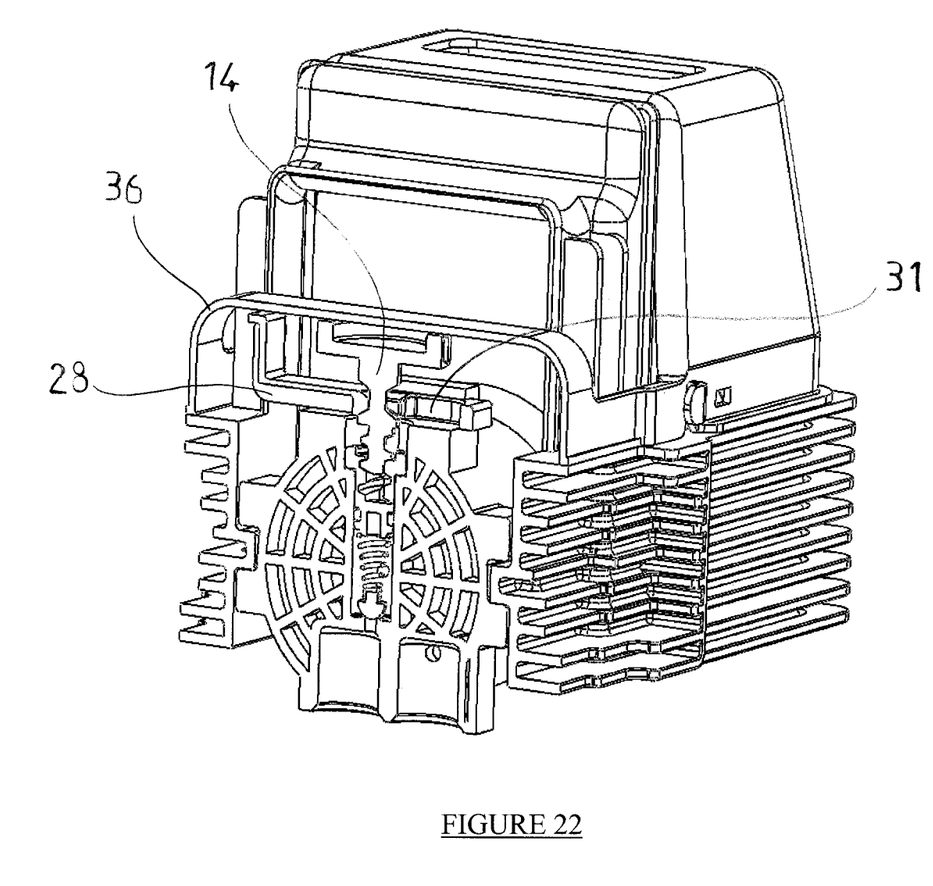

A first possibility of action by the user is the capacity to act directly and manually on the screw 14 in order to alter its angular position. This is the case shown in FIGS. 21 and 22 in which the device comprises a hood 36 secured to the chassis 1 with a lumen 37 through which the ring gear 36 of the head 25 of the screw 14 is at least partially accessible for handling by the user. An indicator of the angular position of the screws may be provided so that it is possible to read the working pressure corresponding to the angular position of the screw 14.

In another possibility, the rotation of the screw 14 may be motor-driven. This allows operation through a control button, for example positioned on the front of a beverage making machine, or a control that is entirely automatic on the detection of a type of packaging from a list of predetermined types of packaging, each one of which is assigned water pressure settings. For example, the sensor is able to identify a type of packaging based on its colour, its shape, any tag that it might bear or other such system, and generate specific control for the motor drive system.

Figure 20:
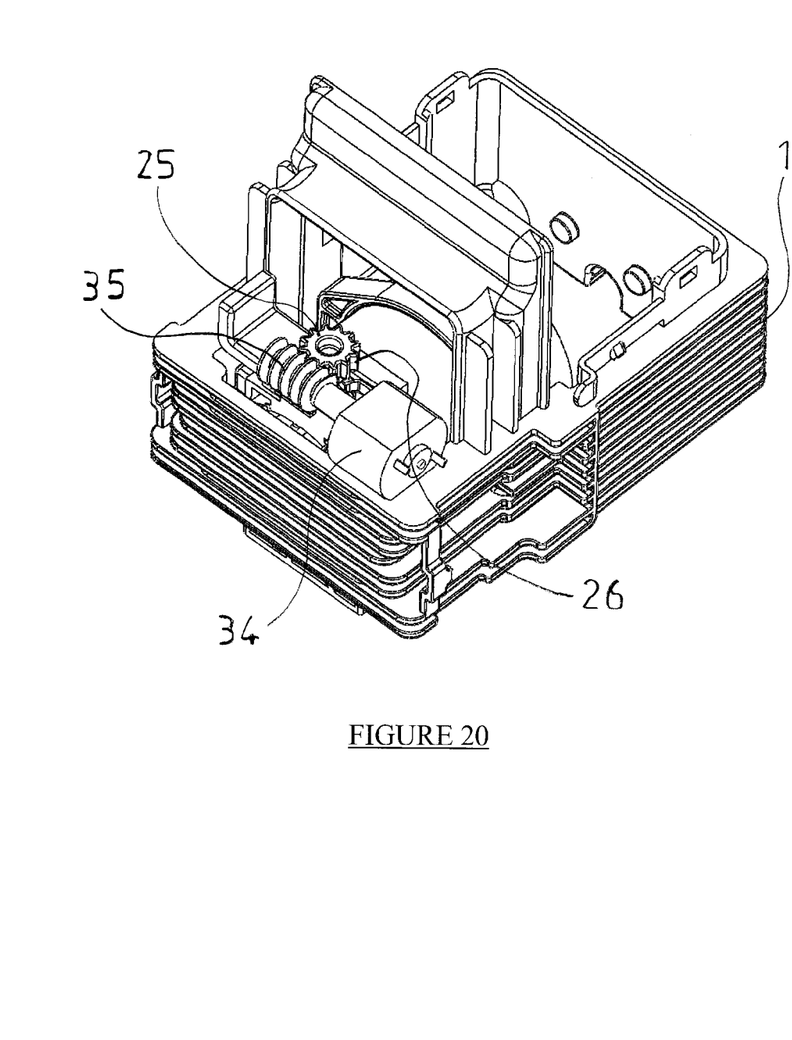
FIGS. 20 to 22 show the possibilities of integrating the adjustable means in an infusion machine.

The motor drive system is shown in FIG. 20 in the form of a motor 14, such as an electric motor, driving a worm screw 35, itself meshing with a ring gear 25 integral with the screw 14.

It is thus possible to simply and effectively vary the pressure/flow operating point of the machine so that it is able to execute low pressure infusion, for example of filter coffee, chocolate or other substances, or ultra-high pressure infusion of tea or, in the intermediate pressure position, the infusion of espresso coffee drinks.

It is to be noted that the change of pressure developed by the invention may take place before an infusion cycle begins so as to reach a target pressure level, or follower pressure curve, at least during part of the infusion cycle. Therefore, the pressure can be adjusted manually or automatically during the infusion process.

The machine may be equipped with data storage means in order to store the pressure curves and/or types of packaging. Advantageously, the user is able to store fixed or variable pressure curves throughout the cycle.

All the parts comprising the device described here can be executed with simple forms enabling them to be manufactured using injected plastic techniques rendering its manufacture extremely economical.

| References |
|---|
| 1. Chassis |
| 2. Outlet portion |
| 3. Spout |
| 4. Inlet portion |
| 5. Drive means |
| 6. Downstream part of the injection channel |
| 7. Valve |
| 8. Connection opening |
| 9. Upstream part of the injection channel |
| 10. Spring |

| References |
|---|
| 11. Slider |
| 12. Support base |
| 13. Seal |
| 14. Screw |
| 15. Thread |
| 16. Body |
| 17. First part |
| 18. Second part |
| 19. Groove |
| 20. Throat |
| 21. Bearing component |
| 22. Guide surface |
| 23. Hole |
| 24. Internal thread |
| 25. Head |
| 26. Toothed ring |
| 27. Rails |
| 28. Lock |
| 29. Lug |
| 30. Guide |
| 31. Extraction orifice |
| 32. Blocking orifice |
| 33. Blocking surface |
| 34. Motor |
| 35. Worm screw |
| 36. Cover |
| 37. Lumen |
| 38. Guide part |
| 39. Inlet end |
| 40. Injection end |
| 41. Travel limit surface |
| 42. Slider contact surfaces |
| 43. Transversal stops |

The invention claimed is:

1. An infusion device comprising:

an infusion chamber for receiving a substance to be infused and passing pressurized water through the substance to be infused, the infusion chamber having a water intake portion in the infusion chamber and an infused drink outlet portion;

an injection channel in fluid communication, by an injection end, with the intake portion and connectable by an inlet end to a pressurized water circuit; and an adjustable organ configured for varying a water pressure in the injection channel to generate a water pressure difference between the inlet end and the injection end, and controlled by a control element located outside the infusion chamber;

wherein the adjustable organ varies a head loss and comprises:

a valve installed opposing an elastic return element configured to close the injection channel when the water pressure exerted on the valve falls below a force of the elastic return element; and an organ for adjusting the force of the elastic return element, which includes a compressible device, wherein the adjustable organ varies compression of the compressible device, wherein the adjustable organ comprises a bearing component pressing on the compressible device, a position of the bearing component being adjustable to suit a direction of compression of the compressible device, and wherein the adjustable organ comprise a screw forming a helicoidal slide for movement of the bearing component.

2. The device according to claim 1, further comprising a hood that covers at least partially the infusion chamber, the control element being accessible on the outside of the hood.

3. The device according to claim 1, wherein the control element is configured to operate the adjustable organ when the infusion chamber is closed.

4. The device according to claim 3, wherein the control element is configured to allow operation of the adjustable organ in order to vary the water pressure when water goes through the substance to be infused.

5. The device according to claim 1, wherein the control element comprises a manually movable part, the water pressure being a function of the position of the manually movable part.

6. The device according to claim 1, wherein the control element comprises an electric circuit and at least one button for controlling the electric circuit.

7. The device according to claim 6, wherein the control element comprise means for storing data relating to at least one pressure curve to be applied during an infusing cycle.

8. The device according to claim 1, wherein the bearing component is a slider that is translationally movable by tightening or loosening the screw.

9. The device according to claim 8, wherein the screw is fitted so as to be rotationally mobile only and wherein the helicoidal slide is formed between the screw and the slider.

10. The device according to claim 9, further comprising a surface for translational blocking of the screw, the said surface being movable between an active blocking position of the screw and an inactive position for extraction of the screw.

11. The device according to claim 10, wherein the surface is configured to press against a bearing surface of the screw by exerting a force on the screw opposing decompression of the compressible device.

12. The device according to claim 1, wherein the control element comprises an activating element for rotationally activating the screw.

13. The device according to claim 12, wherein the activating element comprises a manually-operated or motor-driven rotational control.

14. The device according to claim 13, further comprising a mark identifying an angular position of the screw.

15. The device according to claim 1, wherein the compressible device is a coil spring.

* * * * *